United States Patent [19]
Corley et al.

[11] Patent Number: 6,127,508
[45] Date of Patent: *Oct. 3, 2000

[54] EPOXY RESIN AND AMINE-TERMINATED POLYAMIDE FROM AMINOALKYLPIPERAZINE

[75] Inventors: Larry Steven Corley, Houston; Martin L. Ehrlich, Sugar Land, both of Tex.

[73] Assignee: Shell Oil Company, Houston, Tex.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/859,518

[22] Filed: May 20, 1997

Related U.S. Application Data

[63] Continuation of application No. 08/558,359, Nov. 16, 1995, abandoned.

[51] Int. Cl.[7] ............................ B32B 27/04; B32B 27/36; C08L 63/02; C08L 79/04
[52] U.S. Cl. ..................................... 528/111.3; 428/297.4; 428/413; 428/414; 525/420.5; 525/423; 528/118
[58] Field of Search .................................. 528/94, 111.3, 528/118; 525/420, 420.5, 423, 533; 523/210, 207, 215, 217, 444, 455, 461, 468; 428/413, 297.4, 414

[56] References Cited

U.S. PATENT DOCUMENTS

| | | | |
|---|---|---|---|
| 3,655,595 | 4/1972 | Higashi | 260/18 EP |
| 4,082,708 | 4/1978 | Mehta | 260/18 N |
| 4,086,197 | 4/1978 | Bouche et al. | 260/18 PN |
| 4,115,296 | 9/1978 | Andrews | 525/533 |
| 4,206,097 | 6/1980 | Drawert et al. | 525/526 |
| 4,268,656 | 5/1981 | Ray-Chaudhuri et al. | 525/507 |
| 4,332,711 | 6/1982 | Kooymans et al. | 523/402 |
| 4,362,847 | 12/1982 | Kooijmans et al. | 525/172 |
| 4,569,971 | 2/1986 | Sasse et al. | 525/109 |
| 4,698,396 | 10/1987 | Drawert et al. | 525/420.5 |
| 5,017,675 | 5/1991 | Marten et al. | 528/111 |
| 5,296,556 | 3/1994 | Frihart | 525/420.5 |
| 5,296,557 | 3/1994 | Frihart | 525/423 |
| 5,301,940 | 4/1994 | Seki et al. | 273/72 |
| 5,319,004 | 6/1994 | Marten et al. | 525/533 |
| 5,385,986 | 1/1995 | Frihart et al. | 525/533 |

FOREIGN PATENT DOCUMENTS

| | | | |
|---|---|---|---|
| 0423577-A1 | 10/1990 | European Pat. Off. | C08G 69/34 |
| 51-048081 | 12/1976 | Japan | B41M 00/00 |
| 61-03734 | 4/1986 | Japan | C08G 59/44 |
| 61-162564 | 7/1986 | Japan | C09D 3/58 |

*Primary Examiner*—Robert E. Sellers
*Attorney, Agent, or Firm*—Y. Grace Tsang

[57] ABSTRACT

An epoxy resin composition containing a) an epoxy resin and b) a liquid amine terminated polyamine curing agent prepared by condensing an aminoalkylpiperazine and a dicarboxylic acid. The epoxy resin composition typically requires less than 35% of solvent to produce a sprayable viscosity. A hydroxy-functional flexibilized resin is also produced by reacting (a) an epoxy resin, (b) a liquid aminoalkylpiperazine-based amine terminated polyamine and (c) a hydroxy-functional amine.

18 Claims, 1 Drawing Sheet

6,127,508

EPOXY RESIN AND AMINE-TERMINATED POLYAMIDE FROM AMINOALKYLPIPERAZINE

This is a continuation of application Ser. No. 08/558,359, filed Nov. 16, 1995, now abandoned.

FIELD OF INVENTION

This invention relates to epoxy resin systems. In one aspect, the invention relates to polyamide-amine curing agents for epoxy resin systems.

BACKGROUND OF THE INVENTION

A typical commercial ambient cure epoxy coating contains condensates of dimer acids with polyethylene polyamines containing more than 4 amine hydrogen atoms as a curing agent and a solution of a solid epoxy resin. This epoxy coating system has excellent flexibility, adhesion to many substrates, and resistance to water and many types of solvents. However, a problem with this system is that a solvent content of almost 50% is necessary in order to obtain a "sprayable" (Gardner D or lower) viscosity. A large fraction of such solvent evaporates from a coating, or other exposed layer of epoxy resins during cure, and thereby behaves as a volatile organic compound (VOC). Environmentally it is desirable to have low VOC content.

Solvent requirements can be reduced considerably by using a system based on liquid epoxy resin with the above polyethylene polyamine curing agent. However, this approach tends to lead to coatings with low flexibility.

It is therefore an object of the present invention to provide epoxy coating systems which have good flexibility with reduced solvent requirements. Further, it is desirable to obtain epoxy systems for secondary containment membranes with increased tensile elongation with no losses, or minimal losses, in tensile or tear strength. It is also desirable to obtain epoxy systems for composite and adhesive applications with both increased tensile elongation and increased tensile strength and modulus as compared to current systems.

SUMMARY OF THE INVENTION

According to the invention, an epoxy resin composition is provided comprising:

(a) an epoxy resin having at least 1.5 epoxy groups per molecule, and (b) at least one liquid amine terminated polyamine prepared by reacting a long-chain dicarboxylic acid and an aminoalkylpiperazine. The composition is useful for high solids coating applications, for adhesive and membrane applications, and for preparing impregnated substrates.

DETAILED DESCRIPTION OF THE INVENTION

Figure 1:
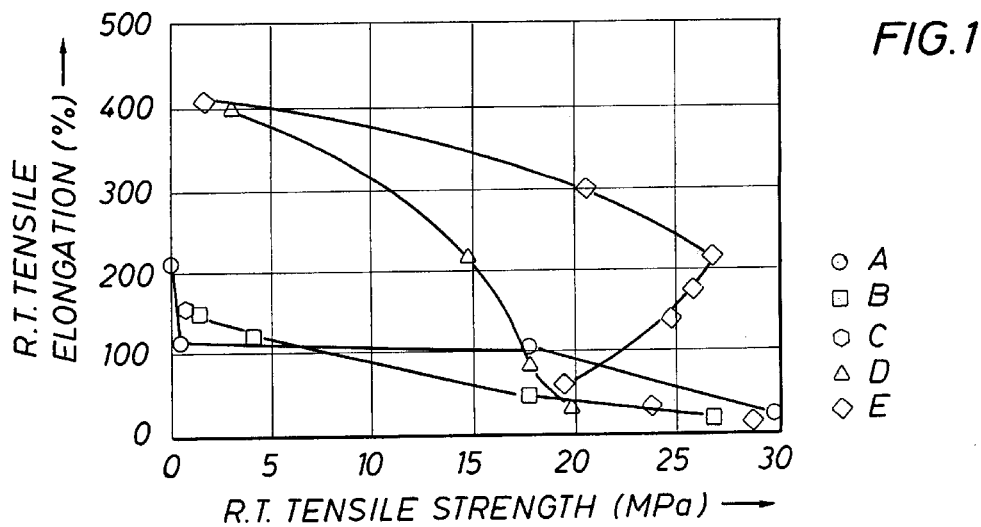
FIG. 1 is a plot of the tensile elongation versus tensile strength for the cured epoxy resin systems cured with a liquid amine terminated polyamine prepared by reacting dimer acid with N-(2-aminoethyl)piperazine and those cured with comparative curing agents.

Accordingly, it is desirable to obtain an epoxy resin system having less than about 35% solvents content. It has been found that the epoxy resin system of the invention with a liquid aminoalkylpiperazine-based amine terminated polyamide as curing agent at 70% solids has a viscosity approximately the same as that of the epoxy resin system containing condensates of dimer acids with standard polyethylene polyamines as a curing agent at 50% solids. Further, it has been found that the cured product has good tensile elongation, generally above about 50 percent, often above 100 percent. The liquid aminoalkylpiperazine-based amine terminated polyamine can also be used as a chain-extender or a reactive "plasticizer" to provide good flexibility to cured epoxy resin products.

The aminoalkylpiperazine-based amine terminated polyamide can be produced by reacting long-chain dicarboxylic acids such as dimerized fatty acids ("dimer acids") or adducts of acrylic and methacrylic acid with unsaturated fatty acids ("adduct acids") with aminoalkylpiperazines under conditions effective to produce a liquid amine terminated polyamide. The resultant polyamides have a number-average amine hydrogen functionality of above 1.7 and up to 4. Preferably the polyamide has an amine plus acid number greater than about 250 and has an excess of amine groups over acid groups.

The aminoalkylpiperazine-based amine terminated polyamide may be prepared by thermal condensation of the aminoalkylpiperazine, preferably in excess, with one or more long-chain dicarboxylic acids or their esters under conditions effective to produce a liquid aminoalkylpiperazine-based amine terminated polyamide. Generally the reaction is carried out at a temperature gradually climbing to a level of above about 200° C., preferably at a final temperature within the range of from about 220° C. to about 260° C., for a time effective to produce a liquid reaction product, followed by distillation, preferably under vacuum, to remove excess unreacted amine, as well as water and/or alcohol reaction product. (The water or alcohol reaction product generally distills at atmospheric pressure before vacuum is applied.) The term "liquid" refers to compositions which have a melting point, or ring and ball softening point (ASTM E28-67) of below room temperature (typically 25° C.). These liquid aminoalkylpiperazine-based amine terminated polyamides are low molecular weight oligomers, typically having number average molecular weight within the range from about 400, preferably from about 700, to about 3000, preferably to about 2000. Alternatively, the amine may be reacted with a chloride of the dicarboxylic acid, but this synthetic procedure is less desirable because of the byproducts produced and the cost of the acid chlorides.

Preferably the long-chain dicarboxylic acid is a dicarboxylic acid having from 18 to 50 carbon atoms. More preferably, the long-chain dicarboxylic acid has from 30 to 40 carbon atoms.

The term "dimer acids" refers to polymeric or oligomeric fatty acids typically made from addition polymerization, using heat and a catalyst, of unsaturated fatty acids, particularly tall oil fatty acids. These polymeric fatty acids typically have the composition of up to about 20% of $C_{18}$ monobasic acids, about 45 to 95% of $C_{36}$ dibasic acids, and about 1 to 35% of $C_{54}$ tribasic and higher polymeric acids. The relative ratios of monomer, dimer, trimer and higher polymer in unfractionated dimer acid are dependent on the nature of the starting material and the conditions of polymerization and distillation. Methods for the polymerization of unsaturated fatty acids are described, for example, in U.S. Pat. No. 3,157,681.

Examples of the "adduct acids" include adducts of acrylic acid, methacrylic acid, crotonic acid, etc. with linoleic acid, soybean oil fatty acid, tall oil fatty acid, etc. These adducts are normally prepared by thermal reaction at temperatures $\leq 200°$ C. Methods for the preparation of these adduct acids are described, for example, in U.S. Pat. No. 3,753,968.

Aminoalkylpiperazines can be represented by the following formula:

where $R^1$ and $R^2$ are each independently —H or —$R^3$—$NH_2$, wherein $R^3$ is a divalent aliphatic linkage, preferably a chain of —$CH_2$— units with optional —$CHR^4$— or $CR^4R^5$— units, wherein $R^4$ and $R^5$ are independently alkyl groups, provided that at least one of $R^1$ and $R^2$ is —$R^3$—$NH_2$—. The divalent aliphatic linkages preferably have 2–6 carbon atoms.

Examples of the aminoalkylpiperazines include N-(2-aminoethyl)piperazine, N,N'-bis(2-aminoethyl)piperazine and N,N'-bis(3-aminopropyl)piperazine. N-(2-aminoethyl)piperazine and N,N'-bis(2-aminoethyl)piperazine are typical byproducts of the commercial production of ethylene amines from ammonia and ethylene oxide or ethylene dichloride. N,N'-bis(3-aminopropyl)piperazine is prepared by reacting piperazine with acrylonitrile to form N,N'-bis(2-cyanoethyl)piperazine, followed by hydrogenation of the nitrile groups to amine groups. Methods for the preparation of aminoalkylpiperazines are described, for example, in I. Ono, *Kagaku Keizai,* 26(6), pp.20–27 (1979) and Q. Sun and C. Zhu, *Shanghai Diyi Yixueyuan Xuebao,* 12(3), pp.178–182 (1985).

To produce a liquid amine terminated polyamide curing agent one uses a starting ratio of moles of aminoalkylpiperazine to equivalents of carboxyl group in the acid or acid mixture used of greater than 0.75:1, more preferably greater than 0.9:1, still more preferably greater than 1:1.

The amine terminated polyamide curing agent can also be prepared by reacting an aminoalkylpiperazine with one or more long-chain dicarboxylic acids and optionally one or more other dicarboxylic acids. Such other dicarboxylic acid can be any dicarboxylic acid having carbon numbers from 4–20, which can be a long-chain or not a long-chain dicarboxylic such as, for example, azelaic acid, sebacic acid, and adipic acid. Preferably, the dicarboxylic acids are all long-chain dicarboxylic acids. A minor amount (up to about 25% of total carboxyl equivalents) of a monocarboxylic acid such as tall oil fatty acid may also be added as a chain terminator. To obtain the amine terminated polyamide curing agent useful for the invention, up to about 50% of the total carboxyl equivalents, a dicarboxylic acid which is not a long-chain dicarboxylic acid can be used depending on the intended use of the product.

The amine terminated polyamide curing agent is present in an amount effective to cure the epoxy resin. The mole ratio of the epoxy resin to liquid amine terminated polyamine curing agent is typically from about 3:1, preferably from about 2:1, to about 1:3, preferably to about 1:2.

An accelerator can be included to increase the cure rate of the epoxy resin-curing agent system. Various amine-compatible accelerators can be used as long as they are soluble in the amine curing agents. Examples of accelerators include metal salts such as, for example, sulfonates, phosphonates, sulfates, tetrafluoroborates, carboxylates and nitrates of Groups IA, IIA and transition metal series of the Periodic Table (CAS version), preferably Mg, Ca, Zn and Sn salts, and complexes thereof; inorganic acids such as, for example, $HBF_4$, $H_2SO_4$, $H_2NSO_3H$ and $H_3PO_4$; carboxylic acids, preferably hydroxy-substituted carboxylic acids such as, for example, salicylic, lactic, glycolic and resorcylic; phenolic compounds such as, for example, phenol, t-butylphenol, nonylphenol and bisphenol A; imidazoles; cyanamide compounds such as dicyandiamide and cyanamide; sulfonamides such as, for example p-toluenesulfonamide, methanesulfonamide, N-methylbenzenesulfonamide and sulfamide; and imides such as, for example, phthalimide, succinimide, perylenetetracarboxylic diimide and saccharin.

When the cure rate at the desired temperature is suboptimal, it is preferable to include the accelerator. For example, for adhesive applications and civil engineering applications where application at low temperature is desired, it may be preferable to include the accelerator. It is particularly preferable to include the accelerator if the amine groups are hindered or the concentration of amine groups is low. The accelerators are typically present in an amount of from about 0, preferably from about 0.1, weight percent to about 10 weight percent, preferably to 5 weight percent, based on the epoxy resin.

More preferable accelerators for the invention include, for example, calcium alkylbenzenesulfonates, dicyandiamide, calcium nitrate, magnesium alkanesulfonates, tetrafluoroboric acid, salicylic acid, phenol, dichloroacetic acid, trifluoroacetic acid, and mercaptoacetic acid.

The epoxy resin can be any epoxy resin which can be cured by the amine terminated polyamide curing agent. Generally, the epoxy resin can be any curable epoxy resin having a 1,2-epoxy equivalency greater than one and preferably, on the average, more than about 1.5 epoxide groups per molecule. The epoxy resin can be saturated or unsaturated, linear or branched, aliphatic, cycloaliphatic, aromatic or heterocyclic, and may bear substituents which do not materially interfere with the curing reaction. Such substituents can include bromine. The epoxy resin may be monomeric or polymeric, liquid or solid, but is preferably liquid at room temperature. Suitable epoxy reins include glycidyl ethers prepared by reacting epichlorohydrin with a compound containing at least one, preferably two or more, hydroxyl groups carried out under alkaline reaction conditions. Examples of epoxy resins suitable for use in the invention include polyglycidyl ethers of polyhydric phenols, epoxy novolacs or similar glycidated polyphenolic resins, polyglycidyl ethers of glycols or polyglycols, and polyglycidyl esters of polycarboxylic acids.

The preferred epoxy resin is a resin based on a polyglycidyl ether of a polyhydric phenol for coatings, including cathodic electrodeposition, applications (other than highly ultraviolet-resistant topcoats, for which an aliphatic epoxy resin is preferred). Polyglycidyl ethers of polyhydric phenols can be produced, for example, by reacting an epihalohydrin with a polyhydric phenol in the presence of an alkali. Examples of suitable polyhydric phenols include: 2,2-bis(4-hydroxyphenyl)propane (bisphenol-A); 2,2-bis(4-hydroxy- 3-tert-butylphenyl)propane; 1,1-bis(4-hydroxyphenyl) ethane; 1,1-bis(4-hydroxyphenyl)isobutane; bis(2-hydroxy-1-naphthyl)methane; 1,5-dihydroxynaphthalene; 1,1-bis(4-hydroxy-3-alkylphenyl)ethane and the like. Suitable polyhydric phenols can also be obtained from the reaction of phenol with aldehydes such as formaldehyde (bisphenol-F). Fusion products of these polyglycidyl ethers of polyhydric phenols with phenolic compounds such as bisphenol-A are also suitable as epoxy resins, such as those described in U.S. Pat. Nos. 3,477,990 and 4,734,468. Commercial examples of preferred epoxy resins include, for example, EPON® Resins 862, 828, 826, 825 and 1001 available from Shell Chemical Company.

The preferred epoxy resins for use in elastomeric or semielastomeric secondary containment membrane applications, because of their low viscosity and the low modulus and high elongation of the cured products, are polyglycidyl ethers of aliphatic or cycloaliphatic glycols or polyglycols. Aliphatic glycidyl ethers can be produced, for example, by reacting an epihalohydrin with an aliphatic diol (optionally containing ether linkages or sulfone linkages) in the presence of a Lewis acid catalyst followed by conversion of the halohydrin intermediate to the glycidyl ether by reaction with sodium hydroxide. Commercial examples of preferred epoxy resins include, for example, HELOXY® Modifiers 32 (a diglycidyl ether of a poly(propylene oxide) glycol), 68 (the diglycidyl ether of neopentyl glycol) and 107 (the diglycidyl ether of 1,4-cyclohexanedimethanol) available from Shell Chemical Company.

Examples of preferred aliphatic glycidyl ethers include those corresponding to the formulas:

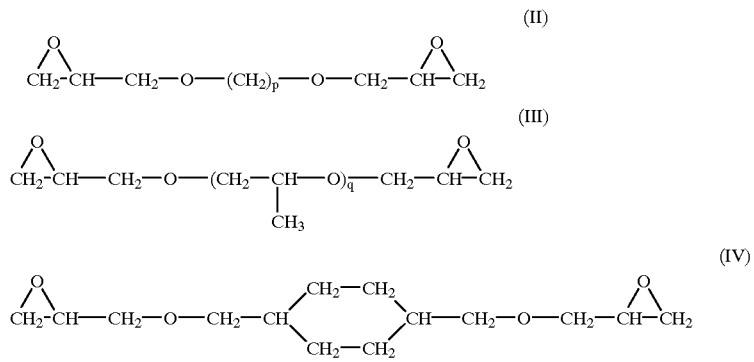

wherein:

p is an integer from 2 to 12, preferably from 2 to 6; and q is an integer from 4 to 24, preferably from 4 to 12.

Examples of suitable aliphatic glycidyl ethers include, for example, diglycidyl ethers of 1,4-butanediol, neopentyl glycol, cyclohexanedimethanol, hexanediol, hydrogenated bisphenol A, and polypropylene glycol; and triglycidyl ethers of trimethylolethane and trimethylolpropane.

The preferred epoxy resin systems of the invention contain one or more epoxy resins, a curing agent containing the amine terminated polyamide, and optionally an accelerator. The epoxy resin can be blended or mixed with the curing agent containing the amine terminated polyamide and optionally the accelerator simultaneously or in any order at a temperature below the cure temperature which is typically below about 100° C.

Further to facilitate handling or application or use in various environments, the curing agent or the epoxy resin system can be diluted with minor amounts of aliphatic, aromatic or cycloaliphatic ketones, alcohols (including glycol ethers) or esters.

The curable epoxy resin composition can be cured at a temperature within the range of from about −40° C., preferably from about −10° C., to about 100° C., preferably to about 75° C., for a time effective to cure the epoxy resin. For standard coating applications the composition is preferably cured at a temperature from about −10° C. to about 75° C. For electrodeposition the composition is preferably cured at a temperature from about 150° C. to about 300° C. For secondary containment membrane applications, the cure temperature is almost always the ambient temperature.

The epoxy resin composition of the invention may include other additives, such as flow control additives such as solvents or anti-sag agents, as well as other additives such as pigments, reinforcing agents, fillers, elastomers, stabilizers, extenders, plasticizers, and flame retardants depending on the application. The epoxy resin composition is useful for coatings, as adhesives, and for sizing or impregnating substrates such as sheets, cords, yarns and prepregs for various applications.

For coating applications, the curable epoxy resin composition can also contain pigments of the conventional type such as iron oxides, lead oxides, strontium chromate, carbon black, titanium dioxide, talc, barium sulfate, phthalocyanine blue and green, cadmium red, chrome green, lead silicate, silica, silicates and the like. Such pigments can be added to the polyamide curing agent component or the epoxy resin component prior to mixing them together. However, iron blue pigment, calcium carbonate and pigments considered reactive because of their basic nature are not compatible in the epoxy resin coating system when used in appreciable quantities. These normally are added to the curing agent component only. Defoamers, tints, slip agents, thixotropes, etc., are common auxiliary components to most coatings and may be employed in the epoxy resin composition of the present invention.

The curable coating composition can be applied to a substrate by brush, spray, or rollers. One of the advantages of the coating system of the invention is the lower solvent content (i.e., less than about 35%) of the curable coating composition.

For adhesives, the curable epoxy resin composition will typically be applied to a substrate either neat or in a solvent, at ambient or elevated temperature. Solvent, if any, will be allowed to evaporate and the substrates will be pressed together, followed by cure of the adhesive at ambient or elevated temperatures.

For impregnation, the curable epoxy resin composition can optionally contain thixotropic agents and halogenated phenolic compounds (the latter especially for printed wiring board uses). The composition can be impregnated on a woven or a non-woven substrate such as nylon, polyester, fiberglass, graphite and aramid, and then cured. In a prepregging process, a fibrous substrate, usually woven glass, is impregnated with a solventless formulation or formulation with solvent (e.g., ketones) containing an epoxy resin composition as described above, optionally containing one or more halogenated phenolic compounds, and the impregnated substrate is passed to an oven maintained at a temperature effective to partially cure the epoxy resin. In a solvent-borne process a conventional process can be used. In a specific embodiment of the solventless lamination process, the prepreg is prepared in a process involving depositing the solventless epoxy resin formulation in the melt onto a rotating roller, passing a fibrous web in countercurrent contact with the resin formulation on the rotating roller so as to transfer the resin formulation into the fibrous web, and passing the resin-containing web to a heating zone to partially cure the resin and form a prepreg comprising the fibrous web and the partially-cured resin. The prepreg can be shaped into a desired shape and cured to obtain a laminate.

For membrane, especially secondary containment applications, membranes can be formed by spreading the uncured composition over a surface such as concrete, masonry, earth, etc. using a tool such as a squeegee.

The aminoalkylpiperazine-based amine terminated polyamides may also be used as flexibilizing units in the preparation of resins for cathodic electrodeposition applications. Preparation of cathodic electrodeposition resins and resin systems is described in references such as U.S. Pat. Nos. 4,332,711 and 4,362,847, which are herein incorporated by reference. Cathodic electrodeposition resins are typically prepared by reacting an epoxy resin with an amine, especially a hydroxy-functional amine such as diethanolamine, to yield a final product which is rich in hydroxyl groups and which has a low or negligible content of epoxy groups. They are subsequently mixed with a curing agent which can react with hydroxyl groups on heating (such as a poly(β-hydroxyalkyl)ester of a polycarboxylic acid, a urea-formaldehyde or melamine-formaldehyde resin, etc.). The mixture is dissolved or suspended in an acidic aqueous bath and is then deposited from the bath onto a metal part which forms the cathode. Heating the metal part in an oven subsequently cures the resin through the hydroxyl groups.

In many cathodic electrodeposition resin systems, it is desirable to incorporate a flexible unit into the backbone of the epoxy-derived resin in order to increase the flexibility, impact resistance, and chip resistance of the cured coating. The compositions of this invention are useful for this application because they both add flexibility and also add basic nitrogen, which contributes to dispersibility of the product resin in an acidic aqueous bath. For a flexibilized resin for cathodic electrodeposition, the aminoalkylpiperazine-based amine terminated polyamide would be mixed with an epoxy resin, preferably a bisphenol A-based epoxy resin such as EPON® Resin 828 or 1001, and another amine, preferably a hydroxy-functional amine such as diethanolamine, such that the equivalents ratio of amine hydrogen to epoxy group is within the range of from about 1:2 to about 2:1, preferably such that the number of equivalents of amine hydrogen is approximately equal to the number of equivalents of epoxy group in the mixture. The weight ratio of the polyamide to the hydroxy-functional amine may be from about 5:95 to about 95:5 by weight. The hydroxy-functional amine can be any hydroxyl group substituted alkylamine. The mixture would be heated to react the amine groups with the epoxy groups and produce a hydroxy-functional flexibilized resin. Adding a curing agent, dispersing the mixture in an acidic aqueous bath, cathodically depositing the uncured resin-curing agent mixture on a metal part, and heat-curing the cathodically deposited film would yield a flexibilized cured coating.

ILLUSTRATIVE EMBODIMENT

The following illustrative embodiments describe the process of the invention and are provided for illustrative purposes and are not meant as limiting the invention.

Examples 1–5 demonstrate use of the aminoalkylpiperazine-based amine terminated polyamine as curing agent. Dimer acid (~10% $C_{18}$ monobasic acids, ~80% $C_{36}$ dibasic acids, ~10% $C_{54}$ tribasic acids) was obtained from Shell Chemical Co. Empol 1014 dimer acid (~4% $C_{18}$ monobasic acids, ~91% $C_{36}$ dibasic acids, ~5% $C_{54}$ tribasic acids and higher acids) and Emerox 1144 azelaic acid were obtained from Henkel Corporation. Tall oil fatty acid (X-TOL 100) was obtained from Georgia-Pacific Corporation. N-(2-aminoethyl)piperazine, ethylenediamine, and 2-methyl-1,5-pentanediamine were obtained from various manufacturers, Dow Chemical Co. and E. I. DuPont de Nemours and Co., respectively. EPON® Resin 828 (a diglycidyl ether of bisphenol A having epoxy equivalent weight of 185–192) and EPON® Resin 1001 (an oligomeric diglycidyl ether of bisphenol A having epoxy equivalent weight of 450–550) were obtained from Shell Chemical Company. HELOXY® Modifier 68 (a diglycidyl ether of neopentyl glycol having an epoxy equivalent weight of 130–140), HELOXY® Modifier 107 (a diglycidyl ether of 1,4-cyclohexanedimethanol having an epoxy equivalent weight of 155–165), and HELOXY® Modifier 32 (a diglycidyl ether of polypropylene glycol having an epoxy equivalent weight of 305–335) were obtained from Shell Chemical Company. NEODOL® 23 alcohol (a linear primary aliphatic alcohol mixture containing primarily 1-dodecanol and 1-tridecanol) was obtained from Shell Chemical Company. EPON® Resin 8132 (a diluted epoxy resin having epoxy equivalent weight of 195–215) was obtained from Shell Chemical Company. EPI-CURE® Curing Agent 3125 (a polyamide-amine curing agent based on dimer acid, fatty acid, and a mixture of polyethylenepolyamines), EPI-CURE® Curing Agent 3115 (a polyamide-amine curing agent based on dimer acid, fatty acid, and triethylenetetramine), EPI-CURE® Curing Agent 3140 (a polyamide-amine curing agent based on dimer acid, fatty acid, and triethylenetetramine), and EPI-CURE® Curing Agent 3266 (an amine curing agent containing a polyurethane backbone) were obtained from Shell Chemical Company.

EXAMPLE 1

Preparation of low amine hydrogen functionality "polyamide" curing agents by reaction of dimerized fatty acid with excess amines "Dimer acid" with a Gardner viscosity of Z4-¼ or (in run #8) Z4-½, (carboxyl equivalent weight between approximately 280 and 290) from the Shell Chemical Company, was mixed in the ratios indicated in Table 1 below with N-(2-aminoethyl)piperazine (AEP), or in the last two (comparative) runs ethylenediamine (EDA) or 2-methyl-1,5-pentanediamine (MPTD) in 1-liter, 2-liter or 5-liter round-bottom flasks (depending on batch size) equipped with a heating mantle, a paddle stirrer, a thermocouple, a nitrogen purge, and a Vigreux column with a vacuum distillation takeoff. The system was purged with nitrogen and heating was started. Typically, when the pot temperature had reached 150–170° C., water began to distill at atmospheric pressure. Water distillation at atmospheric pressure continued until the pot temperature had been raised to 220–240° C.; the pot was held at this temperature until water distillation had stopped or had essentially stopped. Vacuum was then applied and vacuum distillation of excess amine was carried out until the pot temperature had risen back to 220–240° C. and the rate of amine offtake had become essentially negligible. Vacuum stripping was then continued at this temperature for approximately another 15 minutes. The products were then allowed to cool to about 150° C. under vacuum or under a stream of nitrogen and were then poured into jars. The products were characterized by amine nitrogen content (by titration) and viscosity. Results are shown in Table 1 below.

As can be seen from Table 1, halving the ratio of moles of AEP to equivalents of carboxyl group from near 4/1 to near 2/1 resulted in only a relatively small increase in viscosity and decrease in amine nitrogen content. By contrast, the material made with the much more volatile diamine ethylenediamine (EDA), even at a ratio of over 4 moles of amine per equivalent of carboxyl group, was extremely viscous and very difficult to use as a curing agent. The material made with the diamine 2-methyl-1,5-pentanediamine (MPTD) processed normally during synthesis but had another major disadvantage, as shown in the following example.

TABLE 1

| | Run # | | | | | | | | |
|---|---|---|---|---|---|---|---|---|---|
| | 1 | 2 | 3 | 4 | 5 | 6 | 7 | 8 | 9 |
| Amine used | AEP | AEP | AEP | AEP | AEP | AEP | AEP | EDA | MPTD |
| grams | 129.21 | 646.05 | 2261 | 1130 | 1695 | 1695 | 1725 | 120.2 | 581.05 |
| moles | 1.00 | 5.00 | 17.50 | 8.745 | 13.118 | 13.118 | 13.12[a] | 2.00 | 5.00 |
| Dimer acid, | 70 | 350 | 1225 | 1225 | 1837.5 | 1837.5 | 1837.5 | 140 | 350 |
| grams | | | | | | | | | |
| —COOH equivalents | 0.243 | 1.215 | 4.258 | 4.258 | 6.358 | 6.358 | 6.42 | 0.486 | 1.215 |
| Reactant ratio, moles amine/eq COOH | 4.11 | 4.11 | 4.11 | 2.05 | 2.06 | 2.06 | 2.04 | 4.12 | 4.11 |
| Reaction time, hours | 5.5 | 6 | 6 | 5.5 | 4.5 | 6.5 | 3.7 | 4 | 4.4 |
| Atmospheric pressure distillate, g | | 21.2 | 162.5 | 84.35 | 147.9 | 129.36 | 155.26 | (total | 23.28 |
| Vacuum distillate, grams | | 472.25 | 1618.77 | 600.94 | 873.0 | 902.3 | 898.2 | 100.50) | 459.9 |
| Final reaction temperature/ pressure | 220° C./ 40 Pa | 230–240° C./ 20 Pa | 235° C./ 10 Pa | 240° C./ 10 Pa | 230° C./ 17 Pa | 238° C./ 13 Pa | 235° C./ 17 Pa | 160–180° C./ 20 Pa | 230–235° C./ 20 Pa |
| Nonvolatile product, grams | 95.25 | 476.50 | 1652.64 | 1626.45 | 2473.49 | 2460.9 | 2481.3 | 138.34 | |
| Amine nitrogen content, %, by titration | 7.02 | 7.14 | 6.85 | 6.50 | 6.51 | 6.69 | 6.86 | 2.31 | 4.54 |
| Amine nitrogen content, %, theoretical[b] | 7.00 | 7.00 | 7.00 | 7.00 | 7.00 | 7.00 | 7.00 | 4.23 | 3.62 |
| Amine nitrogen equiv. wt.c | 199.5 | 196.2 | 204.4 | 215.4 | 215.2 | 209.4 | 210.6 | 606.4 | 308.5 |
| Amine hydrogen equiv. wt.[d] | 266.0 | 259.7 | 275.5 | 297.3 | 296.7 | 284.8 | 288.3 | 303.2 | 154.3 |
| Ubbelohde kinematic viscosity, 40° C., mm$^2$/sec | 16800 | 18200 | 21100 | 28800 | 24300 | 22400 | 22300 | f | |

[a] Curing agents were prepared by mixing dimer acid with amine in a round-bottom flask equipped with a paddle stirrer, thermocouple and distilling head. The mixtures were heated (under nitrogen) to slow reflux for approximately 2 hours, followed by distillation at atmospheric pressure and finally stripping under pump vacuum at the temperature and pressure indicated above.
[b] Calculated for product composed solely of condensation product of one molecule of dimer acid and two molecules of amine.
[c] Calculated from amine nitrogen content determined by titration.
[d] For polyamides made with EDA or MPTD, the amine hydrogen equivalent weight was calculated by halving the amine nitrogen equivalent weight (two amine hydrogens for each amine nitrogen endgroup). For polyamides made with AEP, the amine hydrogen equivalent weight was calculated by dividing the number average molecular weight (calculated from amine nitrogen content determined by titration) by 3 (with the assumption that the —NH$_2$and —NHgroups have equal reactivity toward the dimer acid so that the average polyamide molecule contains 3 amine hydrogens).
[e] From amine nitrogen content determined by titration (this lot of AEP apparently contained approximately 2% water)
[f] Viscosity was too high to measure conveniently by method used; product was too high in viscosity to be of interest in further examples.

EXAMPLE 2

Preparation of a coating from EPON Resin 828 cured with the products of Example 1 and property comparison with standard "polyamide"-cured epoxy coatings The dimer acid-AEP "polyamide" curing agent from Example 1, run 2, was diluted with a 70:30 (w:w) xylene:n-butyl alcohol mixture to a solids level of 60.97%. The curing agent solution was mixed with an 81.25% solids solution of EPON® Resin 828 in a 1:1:1 (w:w:w) methyl isobutyl ketone (MIBK):propylene glycol monomethyl ether (PGME):xylene mixture (with 110 parts of curing agent per 100 parts of resin). The specific amount of solvents used was that required to obtain a Gardner "D" viscosity. A standard polyamide-cured coating system (EPON® Resin 1001 cured with EPI-CURE® Curing Agent 3115) and a high-solids system cured with a standard polyamide curing agent (EPON® Resin 828 cured with EPI-CURE® Curing Agent 3140) as well as a system based on EPON® Resin 828 cured with the polyamide condensation product of dimer acid with the diamine 2-methyl-1,5-pentanediamine (MPTD)

(Example 1, run 9) were prepared as shown in Table 2 and similarly diluted with the same solvent mixtures to a Gardner "D" viscosity. The resin-curing agent solutions were allowed to stand for 40 or 50 minutes at room temperature (according to Table 2) as an induction period and then applied to cold rolled steel panels. Properties of the coated panels were determined after 24 hours and after 7 days as shown in Table 2 below.

As can be seen from Table 2 below, the system of EPON® Resin 828 cured with the dimer acid-AEP polyamide from Example 1, run 2, after 7 days, was as good in flexibility, pencil hardness and adhesion and almost as good in MIBK resistance and direct and reverse impact resistance as the standard system of EPON® Resin 1001 cured with EPI-CURE® Curing Agent 3115—and the invention system had a Gardner D viscosity at 69% solids compared to 50% solids for the standard system. A second control system using a relatively low viscosity commercial "polyamide" curing agent (EPI-CURE® Curing Agent 3140) as a curing agent for EPON® Resin 828, also had a Gardner D viscosity at 70% solids but was far inferior to the other two systems in impact resistance. A third control system, EPON® Resin 828 cured with a "polyamide" based on dimer acid and 2-methyl-1,5-pentanediamine (MPTD) (product of Example 1, run 9) did not cure at an acceptable rate, with the film being wet even after standing for 4 days.

EXAMPLE 3

Use of dimer acid-AEP polyamides from Example 1 as curing agents for epoxy systems designed for secondary containment membranes in comparison with two commercial polyamide-amine curing agents and a commercial secondary containment membrane curing agent EPON® Resin 8132 (or EPON® Resin 828) was mixed in flasks with some of the dimer acid-AEP polyamides from Example 1 (at various weight ratios). As a control system, EPON® Resin 8132 was mixed with a commercial secondary containment membrane curing agent EPI-CURE® Curing Agent 3266. Two sets of control systems were provided by curing EPON® Resin 8132 with various ratios of EPI-CURE® 3125 and EPI-CURE® Curing Agent 3115 (standard commercial polyamide-amine curing agents). The mixtures were degassed by centrifugation at room temperature (or under vacuum in a flask in a 100° C. oil bath for the more viscous systems based on EPON® Resin 828) and poured into molds consisting of two glass or metal plates separated by a polytetrafluoroethylene spacer ⅛" (3.2 mm) in diameter. The materials were allowed to cure overnight at room temperature and then were postcured for two hours at 100° C. The castings were removed from the molds and test samples were cut from the castings. Test results are shown in Tables 3a through 3d.

TABLE 2

| Resin used (EPON ® Resin. . . ) | 828 | 1001F | 828 | 828 |
|---|---|---|---|---|
| Curing agent used | Polyamide made with AEP (Example 1, run 2) | EPI-CURE ® 3115 | EPI-CURE ® 3140 | Polyamide made with MPTD (Example 1, run 9) |
| Curing agent, phr on resin | 110 | 50 | 80 | 82.5 |
| Resin solution solids content, %[a] | 81.25 | 55.2 | 81.25 | 81.25 |
| Curing agent solution solids content, %[b] | 60.97 | 42.94 | 60.6 | 57.14 |
| System solids content, % | 69.1 | 50.4 | 70.5 | 68.2 |
| Induction time, minutes[c] | 40 | 50 | 50 | 50 |
| Drawdown bar used | 60 | 70 | 60 | 60 |
| Dry time, hours:   Set-to-touch | 4 | 0.5 | 3.5 | (Very wet >24 hours; wet after 4 days) |
| Surface dry | >22 | 4.5 | 5.25 | |
| Through-dry | >24 | 11.5 | 11 | |
| Properties after 24 hours: | | | | |
| Film thickness, μm | 48 | 48–51 | 51–58 | |
| Pencil hardness (ASTM D3363) | 6B (failed 5B) | HB (failed F) | HB (failed F) | |
| Properties after 7 days: | | | | |
| Film thickness, μm | 53–66 | 48–56 | 56–66 | |
| Pencil hardness (ASTM D3363) | F (failed H) | F (failed H) | H (failed 2H) | |
| Direct impact, J (ASTM D2794) | 16.7 | 18.1 | 5.9 | |
| Reverse impact, J (ASTM D2794) | 16.7 | 18.1 | 3.6 | |
| Adhesion, crosscut (ASTM D3359) | 5A | 5A | 5A | |
| MIBK resistance | 45 minutes (pencil B) | 60 minutes (pencil B) | 60 minutes (pencil HB) | |
| Flexibility, conical mandrel (ASTM D522) | 3.2 mm (32% elong.) | 3.2 mm (32% elong.) | 3.2 mm (32% elong.) | |

[a] EPON ® Resin 828 was diluted with a 1:1:1 weight mixture of methyl isobutyl ketone (MIBK):propylene glycol monomethyl ether (PGME):xylene. EPON ® Resin 1001 solution was prepared by diluting EPON Resin 1001-CX-75 (a 75% solution of EPON Resin 1001 in a 65:35 by weight MIBK:xylene mixture) further with a 1:1:1 MIBK:PGME:xylene mixture.
[b] Curing agent solutions (except for EPI-CURE ® Curing Agent 3115) were prepared by diluting the respective curing agent with a 70:30 weight mixture of xylene:n-butyl alcohol. The solution of EPI-CURE ® Curing Agent 3115 was prepared by diluting EPI-CURE ® Curing Agent 3115-X-70 (a 70% solution of EPI-CURE 3115 ® Curing Agent in xylene) further with a 70:30 weight mixture of xylene:n-butyl alcohol.
[c] Amount of time between mixing of resin and curing agent solutions and application of mixture to cold rolled steel panels.

TABLE 3a

| | Curing agent used | | | | |
|---|---|---|---|---|---|
| | Product of Example 1, run 2 | Product of Example 1, run 2 | Product of Example 1, run 3 | Product of Example 1, run 3 | EPI-CURE ® Curing Agent 3266 |
| Curing agent, phr on EPON ® Resin 8132 | 95.5 | 127.3 | 159.1 | 190.9 | 133 |
| $T_g$, Rheometrics, ° C.: tan δ peak | 50 | 44 | 35 | 30 | 31 |
| glassy "knee" | | 24 | 16 | 14 | −7 |
| rubbery "heel" | | 51 | 47 | 38 | 37 |
| Tear resistance, kN/m (ASTM D-624) (crosshead speed 50.8 cm/min) | 56 ± 8 | 112 ± 4 | 75 ± 2 | 44 ± 5 | 13 ± 1 |
| R.T. dry tensile (ASTM D-638, crosshead speed 0.508 cm/min): | | | | | |
| Strength, MPa | 20 ± 1 | 18 ± 1 | 15 ± 1 | 3.3 ± 0.1 | 1.16 ± 0.11 |
| Modulus, MPa | 1018 ± 81 | 633 ± 69 | 40 ± 4 | 3.3 ± 0.5 | 1.06 ± 0.05 |
| Elongation, % | 25 ± 9 | 76 ± 10 | 210 ± 7 | 398 ± 14 | 149 ± 7 |

TABLE 3b

| | Curing agent used | | | |
|---|---|---|---|---|
| | Product of Example 1, run 7 | Product of Example 1, run 7 | Product of Example 1, run 5 | Product of Example 1, run 7 |
| Curing agent, phr on EPON ® Resin 828 | 110 | 140 | 175 | 187 |
| grams curing agent/equiv epoxy group | 205.7 | 261.8 | 327.3 | 349.7 |
| $T_g$, Rheometrics, ° C.: tan δ peak | 54 | 51 | 53 | 41 |
| glassy "knee" | 38 | 36 | 37 | 28 |
| rubbery "heel" | 64 | 55 | 54 | 55 |
| Tear resistance, kN/m (ASTM D-624) (crosshead speed 50.8 cm/min) | (a) | (a) | 160 ± 7 | 124 ± 5 |
| R.T. dry tensile (ASTM D-638, crosshead speed 0.508 cm/min): | | | | |
| Strength, MPa | 29 ± 1 | 24 ± 1 | 20 ± 1 | 25 ± 1 |
| Modulus, MPa | 2002 ± 37 | 1684 ± 39 | 1424 ± 93 | 1380 ± 50 |
| Elongation, % | 7.7 ± 1.7 | 24 ± 17 | 53 ± 10 | 135 ± 18 |
| | Curing agent used | | | |
| | Product of Example 1, run 7 | Product of Example 1, run 5 | Product of Example 1, run 5 | Product of Example 1, run 5 |
| Curing agent, phr on EPON ® Resin 828 | 198 | 210 | 245 | 280 |
| grams curing agent/equiv epoxy group | 370.3 | 392.7 | 458.2 | 523.6 |
| $T_g$, Rheometrics, ° C.: tan δ peak | 40 | 40 | 33 | |
| glassy "knee" | 29 | 27 | 20 | |
| rubbery "heel" | 52 | 46 | 41 | |
| Tear resistance, kN/m (ASTM D-624) (crosshead speed 50.8 cm/min) | 121 ± 7 | 159 ± 3 | 126 ± 11 | 55 ± 4 |
| R.T. dry tensile (ASTM D-638, crosshead speed 0.508 cm/min): | | | | |
| Strength, MPa | 26 ± 1 | 27 | 21 ± 2 | 2.1 ± 0.6 |
| Modulus, MPa | 1303 ± 146 | 975 ± 175 | 231 ± 42 | 3.0 ± 0.4 |
| Elongation, % | 171 ± 16 | 211 | 295 ± 18 | 405 ± 32 |

(a) Too rigid for this test to be run.

TABLE 3c

| | Curing agent used | | | |
|---|---|---|---|---|
| | EPI-CURE 3125 | EPI-CURE 3125 | EPI-CURE 3125 | EPI-CURE 3125 |
| Curing agent, phr on EPON ®Resin 8132 | 66.6 | 114.3 | 200 | 275 |
| $T_g$, Rheometrics, ° C.: tan δ peak | 65 | 40 | 20 | 11 |
| glassy "knee" | 43 | 22 | −1 | −11 |
| rubbery "heel" | 74 | 50 | 31 | 30 |
| Tear resistance, kN/m (ASTM D-624) (crosshead speed 50.8 cm/min) | 17 ± 9 | 70 ± 6 | 6.1 ± 0.5 | 2.3 ± 0.1 |
| R.T. dry tensile (ASTM D-638, crosshead speed 0.508 cm/min): | | | | |
| Strength, MPa | 30 ± 1 | 18 ± 1 | 0.68 ± 0.09 | 0.17 ± 0.01 |
| Modulus, MPa | 1730 ± 21 | 300 ± 38 | 1.1 ± 0.1 | 0.29 ± 0.16 |
| Elongation, % | 13 ± 6 | 98 ± 7 | 111 ± 16 | 208 ± 13 |

TABLE 3d

| | Curing agent used | | | |
|---|---|---|---|---|
| | EPI-CURE 3115 | EPI-CURE 3115 | EPI-CURE 3115 | EPI-CURE 3115 |
| Curing agent, phr on EPON Resin 8132 | 72.2 | 123.8 | 216.7 | 297.9 |
| $T_g$, Rheometrics, ° C.: tan δ peak | 58 | 45 | 24 | 13 |
| glassy "knee" | 41 | 25 | 3 | −5 |
| rubbery "heel" | 64 | 54 | 32 | 22 |
| Tear resistance, Kn/m (ASTM D-624) (crosshead speed 50.8 cm/min) | 21 | 54 ± 6 | 30 ± 1 | 9 ± 1 |
| R.T. dry tensile (ASTM D-638, crosshead speed O.508 cm/min): | | | | |
| Strength, Mpa | 27 ± 1 | 18 | 4.2 ± 0.7 | 1.7 ± 0.3 |
| Modulus, Mpa | 400 ± 95 | 102 | 3.5 ± 0.1 | 1.3 ± 0.1 |
| Elongation, % | 10 ± 2 | 39 | 119 ± 6 | 144 ± 18 |

Figure 2:
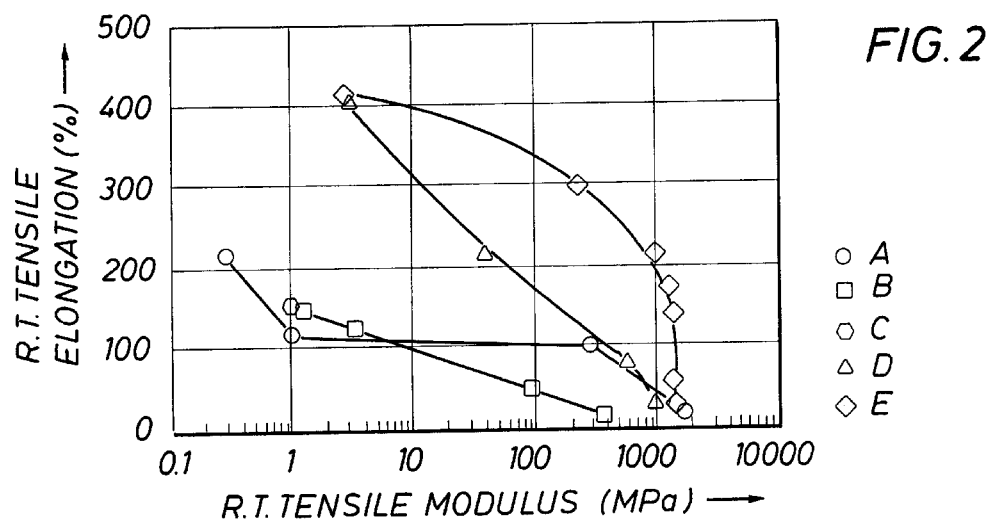
FIG. 2 is a plot of the tensile elongation versus tensile modulus for the cured epoxy resin systems cured with a liquid amine terminated polyamine prepared by reacting dimer acid with N-(2-aminoethyl)piperazine and those cured with comparative curing agents.
Figure 3:
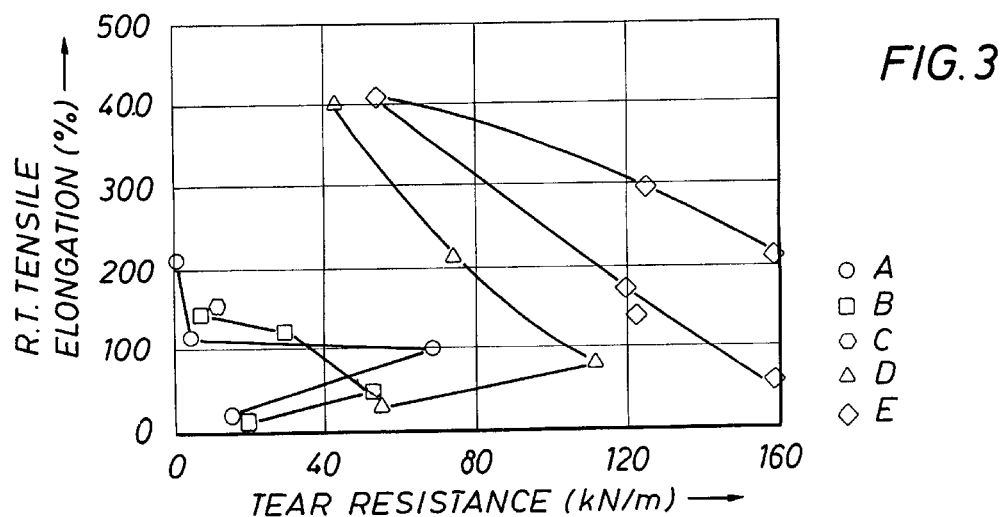
FIG. 3 is a plot of the tensile elongation versus tear resistance for the cured epoxy resin systems cured with a liquid amine terminated polyamine prepared by reacting dimer acid with N-(2-aminoethyl)piperazine and those cured with comparative curing agents.

As can be seen from Table 3a above, systems of EPON® Resin 8132 cured with the AEP-dimer acid condensates from Example 1 are much higher in tear resistance and in tensile strength and modulus, and sometimes in elongation to break, than EPON® Resin 8132 cured with the commercial secondary containment membrane curing agent. Combinations of cured properties obtained with EPON® Resin 828 cured with the AEP-dimer acid condensate from Example 1 were generally even better (Table 3b). From FIGS. 1, 2 and 3, based on the data in Tables 3a through 3d, one can see that castings based on EPON® Resin 828 (plot symbol E) or EPON® Resin 8132 (plot symbol D) and cured with AEP-dimer acid condensates from Example 1, over a range of curing agent/resin ratios, give better combinations of tear resistance and tensile elongation than castings based on EPON® Resin 8132 cured with EPI-CURE® Curing Agent 3125 (plot symbol A) or with EPI-CURE® Curing Agent 3115 (plot symbol B) or the control casting of EPON® Resin 8132 cured with the commercial secondary containment membrane curing agent (plot symbol C). At high tensile elongations, the available combinations of tensile elongation and tensile strength are also better for the compositions based on the invention curing agents (plot symbols D and E) than for either of the other two types of systems.

EXAMPLE 4

Use of product of Example 1 together with a nonreactive diluent as a curing agent for epoxy systems designed for secondary containment membranes EPON® Resin 828 was mixed in flasks with the AEP-dimer acid condensate from Example 1, run 4 (at a range of weight ratios) diluted with various amounts of NEODOL® 23 (a linear primary aliphatic alcohol mixture containing primarily 1-dodecanol and 1-tridecanol). The mixtures were degassed by centrifugation and poured into molds consisting of two metal plates separated by a polytetrafluoroethylene spacer ⅛" (3.2 mm) in diameter. The materials were allowed to cure overnight at room temperature and then were post-cured for two hours at 100° C. The castings were removed from the molds and test samples were cut from the castings. Test results are shown in Table 4.

TABLE 4

| | Run # | | |
|---|---|---|---|
| | 1 | 2 | 3 |
| Curing agent, phr on EPON ® Resin 828 | 140 | 175 | 210 |
| grams curing agent/equiv epoxy group | 261.8 | 327.3 | 392.7 |

TABLE 4-continued

|  | | | |
|---|---|---|---|
| NEODOL ® 23, phr on EPON ® Resin 828 | 15.5 | 19.4 | 23.0 |
| T$_g$, Rheometrics, ° C.: tan δ peak | 50 | 40 | 30 |
| glassy "knee" | 25 | 18 | 8 |
| rubbery "heel" | 57 | 46 | 36 |
| Tear resistance, Kn/m (ASTM D-624) (crosshead speed 50.8 cm/min) | 78 ± 2 | 52 ± 2 | 23 ± 2 |
| R.T. dry tensile: (ASTM D-638, crosshead speed 0.508 cm/min) | | | |
| Strength, Mpa | 15 ± 1 | 12 ± 1 | 3.8 ± 0.6 |
| Modulus, Mpa | 317 ± 33 | 34 ± 8 | 3.0 ± 0.2 |
| Elongation, % | 47 ± 7 | 160 ± 4 | 233 ± 18 |

| | Run # | | |
|---|---|---|---|
| | 4 | 5 | 6 |
| Curing agent, phr on EPON ® Resin 828 | 140 | 174.7 | 210 |
| grams curing agent/equiv epoxy group | 261.8 | 326.7 | 392.7 |
| NEODOL 23, phr on EPON ® Resin 828 | 35 | 43.8 | 52.5 |
| T$_g$, Rheometrics, ° C.: tan δ peak | 30 | 20 | 1 |
| glassy "knee" | 5 | −3 | −10 |
| rubbery "heel" | 36 | 30 | 23 |
| Tear resistance, Kn/m (ASTM D-624) (crosshead speed 50.8 cm/min) | 18 ± 1 | 10.5 ± 0.4 | 8.4 ± 0.3 |
| R.T. dry tensile: (ASTM D-638, crosshead speed 0.508 cm/min) | | | |
| Strength, Mpa | 2.87 ± 0.25 | 1.22 ± 0.14 | 0.81 ± 0.05 |
| Modulus, Mpa | 5.7 ± 0.3 | 2.7 ± 0.1 | 1.78 ± 0.06 |
| Elongation, % | 74 ± 5 | 67 ± 8 | 74 ± 5 |

| | Run # | | |
|---|---|---|---|
| | 7 | 8 | 9 |
| Curing agent, phr on EPON ® Resin 828 | 140 | 175 | 210 |
| grams curing agent/equiv epoxy group | 261.8 | 327.3 | 392.7 |
| NEODOL 23, phr on EPON ® Resin 828 | 60 | 75 | 90 |
| T$_g$, Rheometrics, ° C.: tan δ peak | unclear | 11 | 1 |
| glassy "knee" | −9 | −21 | −25 |
| rubbery "heel" | 26 | 22 | 12 |
| Tear resistance, Kn/m (ASTM D-624) (crosshead speed 50.8 cm/min) | 5.6 ± 0.2 | 4.5 ± 0.3 | 4.0 ± 0.2 |
| R.T. dry tensile: (ASTM D-638, crosshead speed 0.508 cm/min) | | | |
| Strength, Mpa | 0.53 ± 0.12 | 0.31 ± 0.08 | 0.24 ± 0.02 |
| Modulus, Mpa | 3.0 ± 0.1 | 1.9 ± 0.1 | 1.15 ± 0.04 |
| Elongation, % | 22 ± 6 | 20 ± 5 | 27 ± 2 |

EXAMPLE 5

Use of dimer acid-AEP polyamides from Example 1 as curing agents for low-viscosity aliphatic diglycidyl ether epoxy resins in preparation of low viscosity epoxy systems designed for use in elastomeric secondary containment membranes.

HELOXY® Modifiers 68 (neopentyl glycol diglycidyl ether), 107 (diglycidyl ether of 1,4-cyclohexanedimethanol) and 32 (diglycidyl ether of a poly(propylene oxide) glycol) were mixed in flasks, at various weight ratios, with some of the dimer acid-AEP polyamides from Example 1. The mixtures were degassed by centrifugation at room temperature and poured into molds consisting of two glass or metal plates separated by a polytetrafluoroethylene spacer ⅛" (3.2 mm) in diameter. The materials were cured for two hours at 100° C. and then for two hours at 175° C. The castings were removed from the molds and test samples were cut from the castings. Test results are shown in Table 5, in comparison with one of the same control systems used in Example 3.

TABLE 5

| | Run # | | | | | | | | |
|---|---|---|---|---|---|---|---|---|---|
| | 1 | 2 | 3 | 4 | 5 | 6 | 7 | 8 | 9 |
| Resin used | HELOXY 68 | HELOXY 68 | HELOXY 68 | HELOXY 68 | HELOXY 107 | HELOXY 107 | HELOXY 107 | HELOXY 32 | EPON Resin 8132 |
| Curing agent used | Product of Example 1, run #5 | Product of Example 1, run #5 | Product of Example 1, run #6 | Product of Example 1, run #5 | Product of Example 1, run #6 | Product of Example 1, run #6 | Product of Example 1, run #6 | Product of Example 1, run #6 | EPI-CURE 3268 (control) |

TABLE 5-continued

| | Run # | | | | | | | | |
|---|---|---|---|---|---|---|---|---|---|
| | 1 | 2 | 3 | 4 | 5 | 6 | 7 | 8 | 9 |
| Curing agent, phr on resin | 142 | 189 | 236 | 284 | 163 | 204 | 245 | 123 | 133 |
| grams curing agent/ equiv epoxy group | 195.9 | 261.1 | 326.4 | 391.4 | 261.1 | 326.3 | 391.6 | 391.4 | |
| Tg, Rheometrics, ° C.: tan δ peak | 15 | 10 | 5 | 1 | 14 | 10 | 8 | −20 | 31 |
| glassy "knee" | −2 | −5 | −12 | −11 | −3 | −1 | −3 | −34 | −7 |
| rubbery "heel" | 22 | 19 | 10 | 18 | 22 | 15 | 16 | −8 | 37 |
| Tear resistance, Kn/m (ASTM D-624) (crosshead speed 50.8 cm/min) | 8.9 ± 0.3 | 7.7 ± 0.1 | 5.9 ± 0.2 | 6.8 ± 0.2 | 8.4 ± 0.4 | 10.3 ± 0.3 | 10.9 ± 0.2 | 2.3 ± 0.2 | 13 ± 1 |
| R.T. dry tensile (ASTM D-638, crosshead speed 0.508 cm/min): | | | | | | | | | |
| Strength, Mpa | 1.3 ± 0.2 | 0.93 ± 0.23 | 0.69 ± 0.07 | 0.87 ± 0.15 | 0.83 ± 0.17 | 0.78 ± 0.22 | 0.78 ± 0.08 | 0.21 ± 0.03 | |
| Modulus, Mpa | 2.4 ± 0.2 | 1.3 ± 0.1 | 0.41 ± 0.03 | 0.39 ± 0.02 | 0.76 ± 0.08 | 0.70 ± 0.07 | 0.65 ± 0.05 | 0.09 ± 0.01 | |
| Elongation, % | 65 ± 9 | 99 ± 23 | 244 ± 16 | 307 ± 22 | 168 ± 22 | 209 ± 32 | 310 ± 17 | 395 ± 32 | 149 ± 7 |

As can be seen from the data in Table 5, the castings based on HELOXY® Modifier 68 or HELOXY® Modifier 107 and cured with AEP-dimer acid condensates from Example 1, at high curing agent/resin ratios, give considerably higher tensile elongation than the control casting of EPON® Resin 8132 cured with the commercial secondary containment membrane curing agent EPI-CURE® Curing Agent 3266. The increased elongation comes at the expense of only relatively small losses of tensile strength, tensile modulus and tear resistance. These systems, being based on very low viscosity epoxy components, have the advantage of much lower viscosity than the systems in Example 3. The casting based on HELOXY® Modifier 32 is much more elastomeric than the others, with lower modulus and higher elongation, but tensile strength and tear resistance are also much lower.

EXAMPLE 6

Preparation of amine-terminated low amine hydrogen functionality "polyamide" curing agents by reaction of dimerized fatty acids and optionally azelaic acid (chain extender) and/or tall oil fatty acid (chain terminator) with excess N-(2-aminoethyl)piperazine (AEP)

The components shown in Table 6 below were combined in 2-liter reaction kettles with paddle stirrers. The mixtures were heated at approximately 25° C./hour until distillation of reaction product water began. Following water distillation, they were then brought up to final temperature at 55–80° C./hr. Excess AEP was then removed under reduced pressure at the indicated final temperature. Product "polyamides" were liquids at room temperature and had the amine values and amine nitrogen equivalent weights shown below in Table 6.

TABLE 6

| | Run # | | | |
|---|---|---|---|---|
| | 1 | 2 | 3 | 4 |
| Empol 1014 dimer acid, grams | 805.4 | 673 | 568.29 | 411.2 |
| —COOH equivalents | 2.73 | 2.362 | 1.994 | 1.442 |
| Emerox 1144 azelaic acid, grams | | 35 | 69.92 | 107.92 |

TABLE 6-continued

| | Run # | | | |
|---|---|---|---|---|
| | 1 | 2 | 3 | 4 |
| —COOH equivalents | | 0.368 | 0.736 | 1.136 |
| Tall oil fatty acid, grams | 100 | 100 | 86.4 | 86.4 |
| —COOH equivalents | 0.347 | 0.347 | 0.300 | 0.300 |
| Total acid equivalents | 3.077 | 3.077 | 3.03 | 2.878 |
| N-(aminoethyl)-piperazine, grams | 300 | 300 | 300 | 300 |
| Nontertiary amine nitrogen (—NH2, =NH) equivalents | 4.64 | 4.64 | 4.64 | 4.64 |
| Reaction time, hours | 2 | 2 | 2 | 2 |
| Final reaction temperature/pressure | 210° C./ 3.4 kPa | 249° C./ 3.4 kPa | 210° C./ 3.4 kPa | 210° C./ 3.4 kPa |
| Amine value, by titration | 164 | 165 | 173 | 191 |
| Amine nitrogen content, %[a] | 4.08 | 4.12 | 4.32 | 4.76 |
| Amine nitrogen equivalent weight[a] | 343 | 340 | 324 | 294 |

[a] Calculated from amine value determined by titration.

We claim:

1. A curable epoxy resin comprising:
   (a) an epoxy resin(s) having at least 1.5 epoxy groups per molecule;
   (b) a liquid amine terminated polyamide prepared by reacting at least one $C_{18-50}$ dicarboxylic acid, dicarboxylic acid ester or dicarboxylic acid chloride with an aminoalkylpiperazine in a ratio of moles of aminoalkylpiperazine to equivalents of carboxyl group in the acid of greater than 0.75:1; wherein the aminoalkylpiperazine is of the formula:

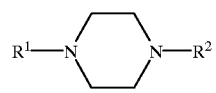

where $R^1$ is hydrogen and $R^2$ is —$R^3$—$NH_2$, wherein $R^3$ is a divalent aliphatic linkage with optional —$CHR^4$— or —$CR^4R^5$— units, wherein $R^4$ and $R^5$ are independently alkyl groups; wherein the molar ratio of the epoxy resin to said liquid amine terminated polyamide is from about 3:1 to 1:3.

2. The composition of claim 1, wherein the aminoalkylpiperazine is N-(2-aminoethyl)piperazine.

3. The composition of claim 2 wherein the dicarboxylic acid is selected from the group consisting of adducts of acrylic and methacrylic acids with unsaturated fatty acids and dimerized unsaturated fatty acids.

4. The composition of claim 2 wherein the dicarboxylic acid is a dimerized unsaturated fatty acid.

5. The composition of claim 1, wherein in (b), said liquid polyamide is prepared by reacting (i) said dicarboxylic acid, dicarboxylic acid ester, or dicarboxylic acid chloride, (iii) at least one other dicarboxylic acid, dicarboxylic acid ester, or dicarboxylic acid chloride, and (ii) said aminoalkylpiperazine.

6. The composition of claim 5 wherein the reaction mixture further comprises a monocarboxylic acid.

7. The composition of claim 1 further comprising a curing agent for epoxy resin other than component (b).

8. The composition of claim 1 further comprising an accelerator.

9. The composition of claim 7 further comprising an accelerator.

10. A substrate impregnated with the curable epoxy resin composition of claim 1.

11. A substrate impregnated with the curable epoxy resin composition of claim 7.

12. A cured composition of claim 10.

13. The composition of claim 10 wherein the substrate is selected from the group consisting of nylon, polyesters, fiberglass, graphite, and aramids.

14. A cured composition of claim 11.

15. A substrate coated with the curable epoxy resin composition of claim 1.

16. An article of manufacture comprising a shaped article having a surface and an adhesive composition comprising the composition of claim 1 applied on at least a portion of said surface.

17. A membrane formed of a cured composition of claim 1.

18. The composition of claim 1, wherein $R^3$ is a divalent aliphatic linkage having from 2 to 6 carbon atoms.

* * * * *